United States Patent [19]

Frier

[11] 4,443,578

[45] Apr. 17, 1984

[54] COLD APPLIED JOINT SEALANT

[75] Inventor: Richard A. Frier, Arlington Heights, Ill.

[73] Assignee: W. R. Meadows, Inc., Elgin, Ill.

[21] Appl. No.: 464,852

[22] Filed: Feb. 8, 1983

[51] Int. Cl.³ .............................................. C08L 95/00
[52] U.S. Cl. ...................... 524/705; 524/62; 524/71
[58] Field of Search ........................... 524/62, 71, 705

[56] References Cited

U.S. PATENT DOCUMENTS

| | | | |
|---|---|---|---|
| T927,004 | 10/1974 | Statton | 260/28 |
| 3,179,610 | 4/1965 | Wood | 524/705 |
| 3,637,558 | 1/1972 | Verdol et al. | 524/705 |
| 3,645,945 | 2/1972 | Lesesne et al. | 524/705 |
| 4,036,797 | 7/1977 | Meader, Jr. | 524/705 |

FOREIGN PATENT DOCUMENTS

| | | | |
|---|---|---|---|
| 51/93928 | 8/1976 | Japan | 524/62 |
| 1323884 | 7/1973 | United Kingdom | 524/705 |

*Primary Examiner*—Melvyn I. Marquis
*Assistant Examiner*—David H. LeRoy
*Attorney, Agent, or Firm*—Lee, Smith & Jager

[57] ABSTRACT

A cold applied joint sealant usable for both portland cement and asphaltic concrete pavements, which comprises an asphalt/urethane formulation resulting from the mixture of a liquid butadiene polymer, containing predominantly primary terminal hydroxyl groups, with a urethane reactant of di- or polyisocyanate. The sealant has low urethane content and cures to provide a low modulus, high penetration, with 85%–95% resilience and zero flow. An initial set time of less than about 120 minutes is achieved, which permits vehicular traffic to be accommodated thereover soon after application.

3 Claims, No Drawings

COLD APPLIED JOINT SEALANT

BACKGROUND AND SUMMARY OF THE INVENTION

The instant invention relates to a low modulus joint sealant compatible with both portland cement and asphaltic concretes comprising a pourable two-component asphalt and urethane formulation offering excellent physical properties with respect to extendability, resiliency, bonding power and long wear life.

In roadway construction and repair, hot applied joint sealers have long been used. They are, however, criticized because of the inherent difficulties with keeping the material hot and moving equipment from one location to another. For example, heating equipment for the kettles, within which the hot sealants are melted, require an initial expense and then upkeep costs. One specific problem with kettle maintenance is that the thermometer oftentimes is rendered defective and the kettle may overheat. Time is also a factor inasmuch as there is a delay while waiting for the material to melt.

With most hot poured sealants the extendability, i.e. the ability to expand, is very low and therefore the force of pavement expansion and contraction causes the face of the pavement in contact with the sealant to tear away. Sufficient resilience in these prior sealants has been provided so that the sealer rejects foreign material from entering the crack, but but does not have adequate extendability to prevent the contraction and expansion of the pavement slab from cracking the slab between the joints.

Additional problems with previous attempts at both hot and cold applied sealers is that traffic must be re-routed for long periods due to the time required for the sealant to attain sufficient stability to resist tire tracking. Generally, the initial set-up time required to accept at least limited traffic has been from about six to twelve hours. In typical pavement joint maintenance procedures, traffic detours should be minimal. A substantially shortened set-up time is therefore desirable.

An asphalt/urethane combination has been suggested for a pourable cold applied sealer utilizing a polybutadiene liquid resin manufactured by ARCO Chemical Company under the trademark POLY BD ®. This cold applied sealer has, however, a high percentage of urethane and provides a high modulus with low penetration. Such is suitable for portland cement concrete where adhesion can be maintained, but it is not particularly suitable with asphaltic concrete where adhesion is a critical concern to the industry.

Accordingly, it is a primary goal of the invention to provide a cold applied joint sealant having high extendability and the property of remaining soft at low temperatures.

It is an object of the invention to provide a cold applied joint sealant that is compatible with portland cement and asphaltic concretes.

It is another goal of the invention to provide a cold applied joint sealer that is self priming.

It is yet another objective of the invention to provide a joint sealant that reaches initial set in two hours or less in order to permit vehicles to be driven thereover.

It is a related objective of the invention to provide a cold applied joint sealant that has low urethane content, a low modulus and high penetration.

It is a concomitant goal of the invention to provide a cold applied joint sealant that comprises two constituents which are simply mixed in the field and ready for application to a crack or joint in less than ten minutes.

It is a concomitant goal of the invention to provide a two-component cold applied joint sealant wherein a first component comprises a urethane reactant in about 1% by weight of the final fomulation and is quickly mixable in the field with a second component comprising 99% of the formulation to form an asphalt/urethane sealer having a urethane content no greater than about 22%.

SUMMARY OF THE INVENTION

The invention may be summarized as providing a cold applied joint sealant formed by mixing two components just prior to application. A reactant, being a di- or polyisocyanate, comprises one component which is mixed with another component comprising: a hydroxyl terminated liquid polybutadiene resin; an inorganic filler, prevented from settling by the inclusion of a thixotropic rheological additive; asphalt; a plasticizing oil, which acts as an extender and diluent; urethane catalysts, for curing the polyurethane; and, an aromatic solvent for modifying viscosity. A polyurethane elastomer is formed by the reactant combining with the hydroxyl terminated liquid polybutadiene resin. The liquid resin is reactive with the di- or polyisocyanate in an optimal range of NCO:OH ratios and they form a sealant having low modulus extension and high penetration, with a low urethane content.

The sealant may be cold applied subsequent to mixing. The aromatic solvent and urethane catalysts act to achieve proper urethane viscosity, and control initial and after-cure properties, respectively.

The joint sealant has an initial set time of about two hours to permit traffic to be driven track-free thereover in a relatively short time. Extension at low temperatures is excellent and proper bonding is attained over a wide range of temperatures for both portland cement and asphaltic concrete pavement joints.

The formulation may eliminate an inorganic filler when track-free time is not critical.

DESCRIPTION OF AN EXAMPLE BEST EMBODYING THE INVENTION

The invention advantageously utilizes the polyurethane-forming properties of a raw material polymer comprising a hydroxyl terminated liquid polybutadiene resin. The liquid is reactive with di- and polyisocyanates to form a polyurethane. The urethane reactant, preferably an aromatic di-isocyanate, is stored as a separate component ready to be mixed just before application.

The first component of the sealant includes asphalt and an aromatic solvent providing a product softener and diluent for the asphalt, and which is compatible with the polyurethane. Also, an inorganic filler is included along with a thixotropic rheological additive, which is an anti-settling agent for the filler. Additionally, the first component includes an aromatic plasticizing oil that dilutes and extends the urethane. Urethane catalysts are also provided for curing the polyurethane, when formed, and which catalytically react to control the initial and after-cure properties of the urethane.

The second component comprises a urethane reactant, which is reactive with the liquid resin to form a polyurethane elastomer.

The constituents of the sealant are expressed herein in percentages by weight of the total formulation.

Raw material liquid polymers, which are hydroxyl terminated homopolymers and copolymers of butadiene, having predominantly primary terminal hydroxyl groups, are known in the industry to be reactive with di- and polyisocyanates. The formulation herein provides for low urethane content, wherein the liquid resin can be provided in a proportion of from about 6% up to about 19%, and optimally is in the range of from about 7% to about 10%. In this optimal range, the second component, the reactant, comprises about 1.0%±0.1% by weight, and is present in the range of from about 0.8%, at 6% resin content to about 2.5% at 19% resin content. The urethane formed thereby is present in the range of from about 7% to about 22%, and optimally is present in the range of from about 8% to about 11%.

The controlling stoichiometry of the formulation involves the ratio of isocyanate to hydroxyl (NCO:OH), which may vary somewhat to change the penetration property of the ultimately cured sealant. A range of about 0.9:1 to 1.2:1 provides excellent adhesive and penetration qualities. The aromatic solvent, which is a viscosity modifier, is provided in the range of from about 1% to about 10% to offer a pourable viscosity at lower temperatrues, particularly below 55° F. The aromatic plasticizing oil is a dilutent for the system and is provided in the range of from about 0% to 25%. With less oil better adhesion is provided and a preferable range is about 12%±2%.

Varying the inorganic filler proportion affects the initial set, or track-free, time. If the sealed joint is not to receive vehicular traffic soon after application, then the inorganic filler may be eliminated. To attain a track-free time of about 90 to 120 minutes, an inorganic filler is provided in the range of from about 25% to about 35% by weight.

Asphalt is provided in the range of from about 35% to about 50%. The asphalt is softened by an aromatic solvent present in the range of from about 1% to about 10%.

The ratio of urethane to asphalt in the applied sealant is accordingly in the range of from about 14%, at 8% urethane content, to about 63%, at 22% urethane content.

Urethane catalysts are provided in a range of from about 0.1% to about 1.5%. The cure properties of the polyurethane are affected by the proportion of catalysts and increasing the proportion will shorten the "pot" life of the sealant following mixing.

EXAMPLES OF COMMERCIALLY AVAILABLE INGREDIENTS USABLE IN FORMULATING THE SEALANT

Some commercially available materials have been found to be particularly useful for practicing the invention, but equivalents are contemplated for use as would be understood by one skilled in the art.

First Component

AC-5 asphalt, having a penetration of 110–170 and meeting ASTM specification D-3381, has been found well-suited. Other straight reduced or solvent extracted asphalts, which meet the ASTM specification, will yield good results.

745 Oil, which is a high aromatic plasticizing oil (about 98%) has been found useful for an extender and is compatible with polyurethane in asphalt. The oil acts as a dilutent and plasticizer for the polyurethane. At greater than about 20–25% oil content the sealant has been found to lose its adhesive properties and a preferable range is below 15%, i.e. 12%±2%.

The inorganic filler may be comprised of various materials. Some of these are calcium carbonate, sand, aluminum silicate, clay filler and lime stone particles. Calcium carbonate is inexpensive and is well-suited for use in this sealant formulation. One calcium carbonate material is commercially available and provides a particle size distribution of 99.5% finer than 44 microns and a particle range of from about 0.3 to 44.0 microns wherein the average particle diameter is 7.0 microns. Eliminating the filler causes the sealant to takes longer in reaching a non-track set. Therefore, utilizing a filler makes the initial set time faster, which is usually desirable, and also gives body to the sealant.

When incorporating a filler it is necessary that it be evenly dispersed in the first component prior to introducing the reactant. Therefore, an anti-settling agent in the form of a thixotropic rheological additive is provided for this purpose. One such additive is presently available from NL Chemicals under the designation NL2000X. The NL2000X anti-settling agent is very useful because it is pourable rather than being a conventional paste-type anti-settling agent. Depending upon the desired set time, the inorganic filler may be present in the range of from 0% up to about 35%. For attaining a relatively fast initial set of 2 hours, or less, the filler is preferably provided in a range of from about 20% to about 25%. Correspondingly, the anti-settling additive is provided in a range of from about 1.0% to about 1.5%.

For purposes of attaining necessary viscosity, an aromatic solvent is provided which is compatible with urethane and asphalt. It serves as a solvent for the asphalt and modifies the viscosity of the urethane. Suitable aromatic solvents include xylene and toluene. Toluene is a better solvent but due to its low flash point, it is somewhat less desirable. Toluene, however, can be used in a smaller proportion than xylene to attain the same viscosity. In the preferred formulations xylene is used and is present in a range of from about 1% to about 10%. Optimally, the xylene is provided in the range of from about 5.0% to 7.0%. In this range, the viscosity of the sealant at lower temperatures is excellent. Viscosity is particularly critical for sealing asphaltic concretes. Prior attempts at cold applied sealants generally work well with portland cement concrete pavement but fail to have the adhesion required for asphaltic concrete. For example, at 0° F., the sealant provides 100% extension for three cycles when testing ½" by 2" by 2" test samples in conjunction with ASTM approved concrete blocks in a standard test procedure. At −20° F., a 300% extension for one cycle is achieved with the same size samples.

Two urethane catalysts are included for achieving useful initial and after cure extendabilities. In the exemplary embodiment a first catalyst comprises dibutyl tin dilaurate (DBTDL) provided in a range of 0.1% to 0.9%, which acts synergistically with a second catalyst comprising an organo lead or mercury. Lead octoate has been found to provide excellent cure properties. The DBTDL effects an initial setting of the urethane in about 2 hours. These catalysts are examples of common urethane catalysts and equivalents are envisioned for use.

The raw material polymer contemplated for use is a hydroxyl terminated liquid polybutadiene resin which is reactive with di-isocyanates and polymeric isocyanates to form polyurethane. One commercially available product is R-45HT POLY BD ® liquid resin manufactured by ARCO Chemical Company. The formation of polyurethane is obtained by the introduction of the urethane reactant in a stoichiometric proportion whereby isocyanate (NCO) and terminal hydroxyl (OH) groups combine to leave no unreacted polyols. A rubber-like elastomeric polyurethane is thus formed. Previous applications of this commercially available product for cold applied sealants have incorporated a high level of urethane and resulted in high modulii and low penetration. The present invention minimizes the use of urethane by the specified introduction of plasticizing oil, aromatic solvents and urethane catlysts to achieve a low modulus sealant with a high penetration. Optimally, 7% to 10% liquid resin is utilized. While the invention offers satisfactory results with the resin provided in the range of up to about 19%, a minimization of urethane is preferred in order to achieve the excellent extendability and penetration values, particularly critical for asphaltic concrete applications. At about 20%, and higher, the proportion of resin is too large and the material hardens to a high modulus. With a high modulus more force is required to pull the sealant apart and the cohesive strength is accordingly higher. Adhesion with asphaltic concretes is then inadequate. Since urethane by nature has a high modulus and it is desirable to provide a sealant with a low modulus, it is necessary to control the polyurethane forming components. The present invention solves this problem.

Second Component

The second component is the reactant component of the sealant. It is not introduced to the inert first component until a short time before application.

The liquid polybutadiene resin of the first component contains predominantly primary terminal hydroxyl groups highly reactive with di- and polyisocyanates. One commercially available urethane reactant is PAPI ®-135, manufactured by The Upjohn Company. This product is a medium viscosity polymethylene polyphenylisocyanate which has high reactivity and an average functionality of 2.7. The NCO:OH ratio may be varied within limits to effect the penetration of the ultimate sealant. A NCO:OH ratio of about 0.9:1 to about 1.2:1 provides suitable properties for the sealant.

Physical Characteristics

In the ranges given for the plasticizing oil, aromatic solvent, urethane catalysts and liquid polybutadiene resin, the "pot" life, or the work-life time during which the sealant is pourable, is relatively short—about 10-30 minutes. The initial set time is also shortened, thereby permitting vehicular traffic to be re-directed quickly over a repair area.

The properties of the sealant meet the needs of the industry for use with a wide range of concrete pavements. The sealant has a low modulus reflected by an extension value of 300% at −20° F., for one cycle, and 100% at −20° F., for three cycles. The track-free time, or the initial set, is 90-120 minutes. Penetration (cone mm/10), or hardness, has been found from testing to be 125-145 at 77° F. and 35-55 at 0° F. Resilience has been tested and found to be from about 85% to about 95%. Flow at 140° F. is 0. In the proportions and ranges given a weight of from about 9.0 to about 11.0 pounds per gallon is obtained. The sealant is also self priming and requires only minor surface preparation.

Because the sealant remains soft at low temperatures it extends very well and has sufficient resilience at cold temperatures to reject foreign materials from entering the sealed crack. Contraction of adjoining slabs is accommodated without cracking the slab along the joints. In effect, the invention provides a cold applied joint sealant which moves with the sealed joint and does not lose integrity in doing so. A very stable interface is maintained between portland cement, or asphaltic, concrete slabs surrounding it.

Example of Preferred Formulation

The following shows the preferred formulation for the two-component sealant.

|  | Percentage by Weight |
|---|---|
| First Component (Part "A") | |
| AC-5 Asphalt | 44.9 |
| 745 Oil | 12.0 |
| Poly BD Liquid Resin | 9.0 |
| Calcium Carbonate | 27.0 |
| NL2000X | 1.0 |
| Xylene | 5.0 |
| DBTDL | 0.1 |
| Lead Octoate | 0.1 |
| Second Component (Part "B") | |
| PAPI ® 135 | 0.9 |

Samples of the "A" and "B" components were prepared and mixed to form the sealant. The sealant samples were then tested pursuant to conventionally applied standards and procedures as follows:

| Property | Typical Test Results |
|---|---|
| Mixing Ratio | 100 parts B to 1 part A |
| Viscosity @ 77° F. | 4500 CPS |
| Flash Point, TCC° F. | 130 |
| Weight/Gallon | 9.9 |
| Work-Life | 20-30 minutes |
| Track-Free Time | 90-120 minutes |
| Penetration (conditioned 72 Hours @ 77° F.) | |
| @ 77° F. | 143 |
| @ 0° F. | 55 |
| Penetration (conditioned 72 Hours @ 120° F.) | |
| @ 77° F. | 125 |
| @ 0° F. | 35 |
| Flow @ 140° F. | 0 |
| Resilience | 90% |
| Bond Test: | |
| ½" × 2", 300% Extension at −20° F., 1 Cycle | Pass |
| ½" × 2" × 2", 100% Extension at −20° F., 3 Cycles | Pass |
| ½" × 2" × 2", 300% Extension at −20° F., 1 Cycle | Pass |

The test results shows a significant improvement in cold applied joint sealers. The low modulus is indicated by the excellent extendability. The initial set, or track-free, time is significantly shorter than existing cold sealers which require from six to twelve hours. The "pot" life, or pourable time, is 20-30 minutes for the formulation given, but this can be lengthened along with the track-free time, without varying the other properties by decreasing the percentage of urethane catalysts. Short initial set time is, as discussed, advantageous. When parts "A" and "B" are mixed, the formulation is pourable and ready for use. It is envisioned that hand-mixing for about eight minutes, or mechanical mixing for five minutes, will assure reacting all the polyols present in the liquid resin to form the elastomeric rubber-like polyurethane.

Procedure for Applying the Sealant

It is contemplated that the cold applied sealant disclosed may be provided in two sealed containers: the first being a lidded container, such as a 1.75 gallon pail; and the second being a container in a sealed pouch which may be suspended inside or outside of the first container. The first container is of a proportional size to store the "A" component, comprising about 99% of the formulation, and the second container is proportionally smaller and stores the "B" component, comprising about 1% of the formulation.

After the "A" component is containerized and stored for a period of time it may develop what is known as "false body". This "false body" is a gel-like state that may result when the "A" component cools in the pail after filling. This phenomenon is permanently reversible when the material is mixed.

After opening the large container, and mixing it to eliminate any false body, the second container is opened and component "B" is introduced into the first container. The formulation can be either hand or mechanically mixed at temperatures above 65° F. Below this temperature, hand mixing may be difficult. Mechanical mixing can be done at lower temperatures, but to enable the sealant to be dispensed within its work-life, it is envisioned that the temperature of the material should be above about 55° F. when mixed and poured. After mixing about eight minutes by hand, or five minutes mechanically, the joint sealer can be poured directly from the container, or transferred to an appropriate dispensing apparatus. The pouring orifice should be large enough to dispense the sealant before the material thickens. For this preferred formulation, an orifice of about ¾ inches, or larger, in diameter will permit pouring from a 1.75 gallon pail, or other dispenser, within the 20-30 minute work-life time.

The work-life of the sealant is defined as the elapsed time after initiation of mixing. This is the time in which the sealant reaches a viscosity at which it becomes difficult to pour from an unpressurized container. The sealant will begin to thicken immediately after mixing and will get progressively thicker as time elapses. For the given ranges of the formulation, the work-life has been found to be quite stable over a wide temperature range. With the "A" and "B" components maintained at 55°-60° F., the work-life for the preferred embodiment was tested and found to be 20 minutes. At 72°-77° F., it was 28 minutes, and at 95° F., it was 30 minutes.

"Cure time" is a rather ambiguous term and has been variously defined throughout the industry. For purposes of this disclosure each stage of the curing process is explained, with respect to the exemplary embodiment, as follows:

A. Following the application, or work, life the sealant progressively thickens. Approximately one hour thereafter, the sealant remains tacky and would still track if exposed to traffic. However, the sealant has sufficient "body" to support a dusting agent on its surface. Limestone dust is an example of an appropriate dusting agent. At about this one hour point, a limited amount of traffic can be tolerated, but might possibly cause tracking if the dusting agent were to be worn into the sealant.

B. After 1½ to 2 hours have elapsed, the sealant will reach an initial set and have sufficient stability that it will not track under normal pedestrian or vehicular traffic. It may maintain a definite stickiness or "after tack" that disappears quickly after normal exposure to dusting and traffic.

C. After about 5 to 6 hours the material exhibits a penetration of approximately 200. Beyond this point, the penetration drops slowly and within 24 hours it will be in the 140-180 range. Within 72 hours, it will fall within the range reported in the testing results above, at which time the sealant will be considered to have reached ultimate cure.

D. The cold applied joint sealant disclosed has an aromatic solvent constituent present in a percentage of about 1% to 10%, and optimally is in the range of about 5.0% to 7.0%. The aromatic solvent aids the mixing, pouring, and adhesion properties of the product. The solvent will slowly dissipate from the cured material. The aging process, as well as normal weathering, will slowly increase the hardness, strength, and toughness of the exposed surface as the solvent dissipates. Over time the sealant becomes increasingly resistant to incompressibles, tearing, and abrasion. The unexposed sealant, within the sealed joint or crack, will beneficially maintain the recited softness and adhesive qualities over a wide range of temperatures. This is particularly significant for asphaltic concrete applications. Prior cold applied sealants offered satisfactory sub-surface softness and adhesion for portland cement concretes, but none has exhibited the adhesiveness and resiliency for use with asphaltic concretes as provided by the present invention.

The effect of ambient temperature on the cure times has been investigated. It was discovered through testing that sealants formulated in the ranges for the ingredients discussed above, will cure at substantially the same rates within a temperature range of from 30° to 120° F. In other words, air and surface temperature variations have no significant effect on curing the material. However, the curing times, and the ability of the sealant to reach the excellent properties shown, are dependent upon maintaining the "A" and "B" components, prior to mixing, at or above 55° F., particularly when mixed and poured in colder weather, i.e., below 50° F.

The sealant is well-suited to filing cracks greater than ⅛" wide but has also been found to have the necessary viscosity to fill narrow cracks having a width of 1/16"-⅛". After pouring the sealant, it will initially "bridge" the narrower opening. After a few minutes, it begins to slowly flow into the crack. Application of the sealant requires only minimal joint preparation, such as by air-blowing loose particles from the crack. Tests on dusty and damp surfaces have shown that the sealant still provides sufficient adhesion. Thus, the invention is suitable for use under adverse conditions, which may be expected in outdoor repair and maintenance procedures.

What is claimed is:

1. A cold applied joint sealant having a pre-mixed formulation comprising:
 asphalt;
 plasticizing oil;
 inorganic filler;
 anti-settling agent;
 a hydroxyl terminated liquid polybutadiene resin;
 aromatic solvent;
 a urethane catalyst; and, a urethane reactant comprising a polymeric isocyanate;

wherein upon mixing the foregoing said hydroxyl terminated liquid polybutadiene resin reacts with said urethane reactant to form a polyurethane present in an amount by weight of from about 8% to 11% and having elastomeric properties, and wherein said sealant is capable of reaching an initial set in less than about 120 minutes and provides 300% extension at minus 20° F. and a penetration value of 125 to 145 @ 77° F. and 35–55 @ 0° F.

2. A two-component cold applied joint sealant system, wherein a first component comprises:

asphalt in the range by weight of from about 35% to 50%;

plasticizing oil in the range by weight of from about 10% to 12%; inorganic filler present in the range by weight of from about 20% to 25%;

thixotropic rheological additive being an anti-settling agent for the inorganic filler present in the range by weight of from about 1.0% to 1.5%;

hydroxyl terminated liquid polybutadiene resin present in the range by weight of from about 7% to 10%;

aromatic solvent present in the range by weight of from about 5% to 10%;

urethane catalysts present in the range by weight of from about 0.1% to 0.9%;

wherein a second component comprises: a urethane reactant comprising a polymeric isocyanate present in the range by weight of from about 0.9% to 1.1%;

wherein said first component and second component are capable of being mixed to form a joint sealant having a polyurethane component, wherein after mixing said first and second components, said sealant reaches at ultimate cure a penetration in mm/10 of 125–145 at 70° F., and 35–55 at 0° F. and, wherein said sealant exhibits zero flow at 140° F. and has a resilience of from about 85% to about 95%.

3. A core applied joint sealant formed by mixing a first component, including asphalt and a hydroxyl terminated liquid polybutadiene resin, with a second component comprising a urethane reactant selected from the group consisting of polymeric isocyanates and diisocyanates; wherein said sealant has a polyurethane content of from about 8% to 11% by weight, and asphalt content in the range of from 35% to 50% by weight, wherein said sealant has a low modulus and exhibits an extension for one cycle of 300% at minus 20° F. and penetration in mm/10 of 125 to 145 at 77° F. and 35 to 55 at 0° F.

* * * * *